Patented June 21, 1932

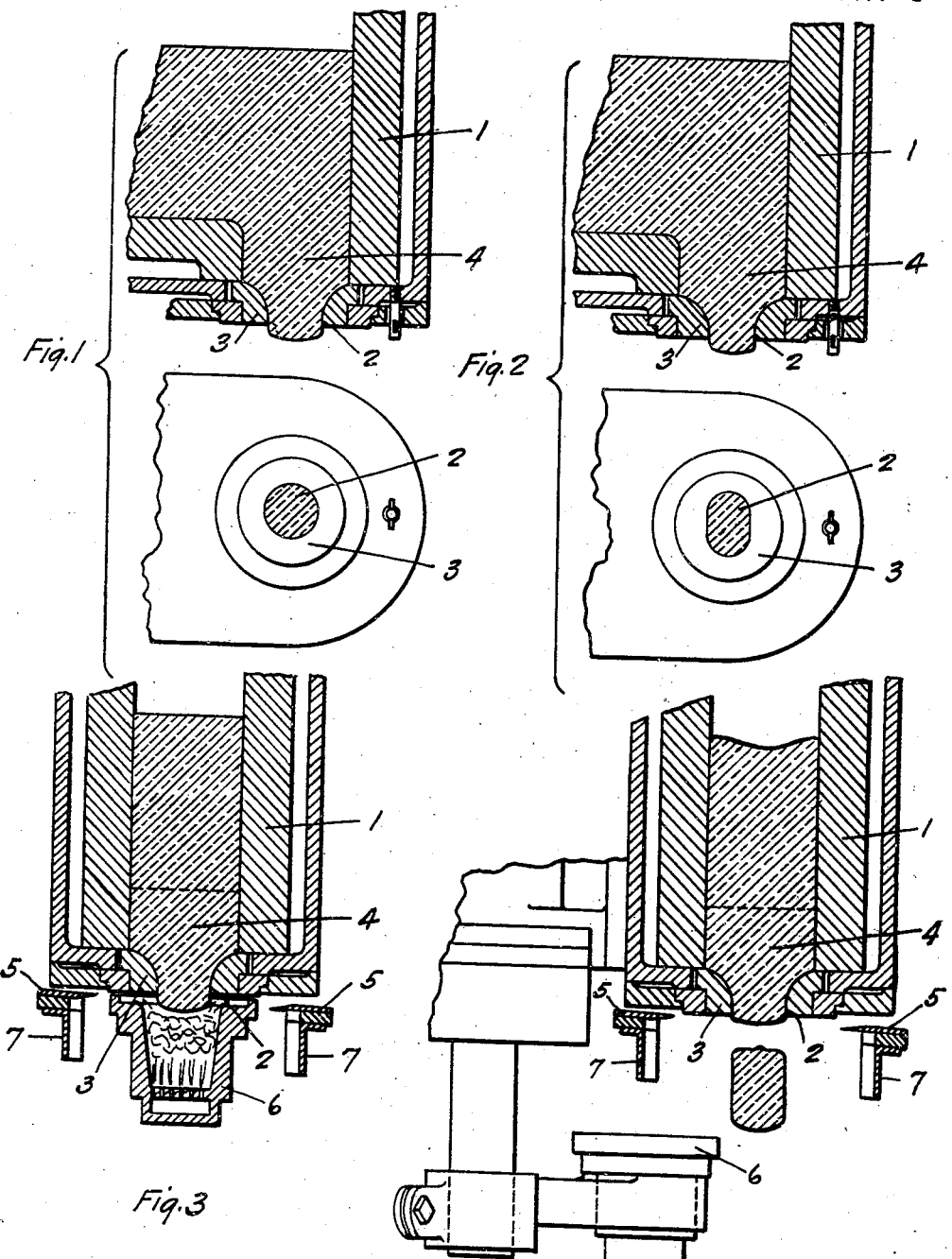

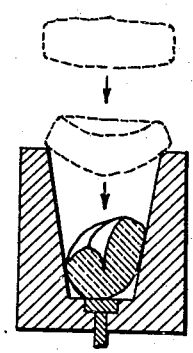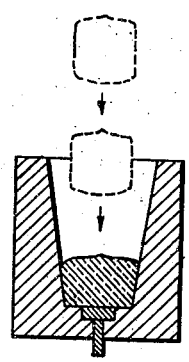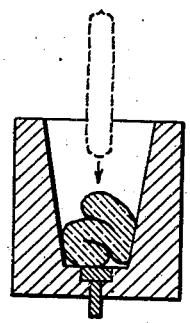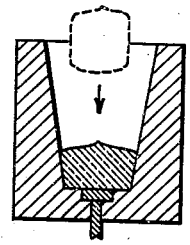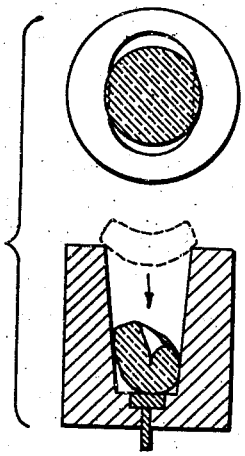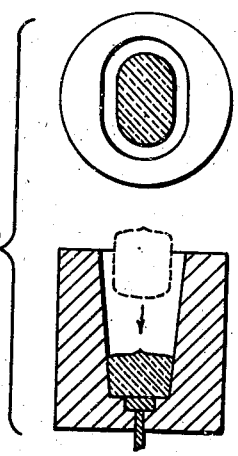

1,864,276

UNITED STATES PATENT OFFICE

WILLIAM A. REEVES AND OLIVER M. TUCKER, OF COLUMBUS, OHIO, ASSIGNORS, BY MESNE ASSIGNMENTS, TO HARTFORD-EMPIRE COMPANY, OF HARTFORD, CONNECTICUT, A CORPORATION OF DELAWARE

METHOD OF GETTING AND DELIVERING PREFORMED CHARGES OF VISCOUS GLASS

Application filed March 7, 1918, Serial No. 220,959. Renewed August 22, 1930.

Our invention relates to a method of getting and delivering preformed charges of viscous glass for subsequent molding, pressing, blowing or otherwise treating. It, also, involves the getting of such charges successively and with regularity. It is preferably performed with apparatus of the type illustrated in our application Serial No. 120,429, filed September 16, 1916.

To fully understand our invention and appreciate its scope, it is perhaps necessary to visualize the several aspects of the problem involved. Then it will be well to briefly set forth the state of the art to illustrate prior attempts at solution.

In practice, the charges must be taken from a viscous mass and delivered to successively presented molds. These molds are usually mounted in spaced relation and have a step-by-step movement to successively present them to a receiving station and then to a treating station. When a given piece of ware is being made, it is customary to use a series of molds whose internal shape, dimensions and capacity are identical, and therefore adapted, when similarly treated, to produce identical pieces of ware in succession. Then, when a different piece of ware is to be made, a new series of molds is used, these new molds varying from the preceding series, as to internal shape, or dimensions, or capacity or as to any two or all three of these characteristics.

With these things in mind, it seems that the problem divides itself into three parts. First, there is the necessity of getting one ideal charge from the mass and into one mold. Second, there is the necessity of duplicating this operation automatically and with considerable rapidity so as to feed the successively presented molds with identical charges, regardless of the variations which are bound to occur in the mass due to unavoidable temperature changes and even though it might be found desirable to change the rate of production. Third, there is the desirability of varying the charges to suit different molds, with or without varying the rate of production.

Originally, in the making of ware of the type in question, the viscous glass charges were gathered and placed in the successively presented molds by a hand operator using a long thin rod with a head upon its end. In this "hand" method, the head of the gathering rod is inserted through a window in the furnace wall into the viscous mass and rotated therein to wind a lump of glass thereon. Then, the rod is withdrawn and the lump of glass permitted to sag into a mold, the lump then being severed. In this operation, the operator guesses the weight. He also attempts, by manipulation, to produce a charge shaped to suit the mold. At one time this method was universally used.

Then, many attempts were made to get charges from mass to mold by flowing the glass into an intermediate measuring and shaping receptacle, usually of metal. None of these have had any success, for it inevitably results that when the viscous glass is delivered to an intermediate receptacle on its way to the mold, defects result in the product.

Others have attempted to form the charge after delivery to the mold. Efforts along this line have generally taken the direction of suction molds dipped in the glass bath or flowing a stream of glass into successively presented molds. In the former, complicated and expensive apparatus is necessary and, even then, the final shearing of each charge leaves irremovable marks therein.

The "flowing stream" method deserves special attention because a clear understanding of what it does and what it does not do will make our own invention more clear. In the "flowing stream" method, a spout is attached to the glass furnace and glass flows continuously through said spout and through an aperture in the spout base, pouring therefrom in a continuous stream which is automatically severed at regular intervals. In this "flowing stream" method, the weight of the charge is regulated by a throttling valve which operates in the delivery orifice of the spout to vary the passage area. Sometimes the regularly operating knives support the oncoming glass after each severing operation and while a new mold is moving into receiving position. No attempt is made to shape or fix the dimensions of the charges before delivery to the molds. On the contrary, the glass is poured into the molds just as one would pour from a pitcher into a bucket.

When glass is poured in this way, it coils in the mold and on the knives and the collected coils never unite without trapping air or without leaving marks in the product. Furthermore, any piling up of hot viscous glass upon knives or in any intermediate receptacle before deposit will result in chilling and resultant defects in the ware. These defects are very serious ones. The stream of glass flows continuously and must, therefore, be throttled until it is relatively thin. Thus this thin glass stream pours from mass through air, the temperature of which is, at least, 1,500 degrees lower than the glass, and enters the mold where it coils in contact with a relatively cold metal surface. The result is that the coils are so chilled that they never unite without resulting disfiguring marks or unequal distribution of glass and strains in the ware. This is one defect of the "flowing stream" method. There are others, but this alone is so serious that, though cheaper than the "hand" method, the "flowing stream" method has never superseded it in the making of high grade ware.

None of these prior art methods for handling glass automatically has ever been able to compete with the "hand" method in the making of high grade ware. Several of them may be successfully used to get charges of proper weight into the mold. And these charges may be in workable condition. But they are never in such condition that ware can be made therefrom free from blemishes or defects. For this reason, the "hand" method is still widely used, though it is more expensive; while the automatic methods have so far been limited to the making of low-grade ware.

Now, the reason for this failure of the automatic methods described, is that all of them involve steps which inevitably mar the viscous glass charges to such an extent that defects or blemishes appear in the ware produced therefrom. For instance, flowing into an intermediate collecting cup places the viscous glass in contact with metal which is at least 1,000 degrees colder than the glass; sucking the viscous glass into a mold and then scraping the surplus from the mold orifice chills the glass at the orifice beyond remedy and because of the same kind of heat exchanging action; passing glass through air and into the mold where it is lapped, coiled or folded together, ignores the fact that the glass thus acquires a chilled skin both from the air and the mold and that two such chilled surfaces will not unite without resulting in irremovable blemishes or defects in the ware.

Our invention comprises a method whereby we are able to get viscous charges of proper weight from viscous mass into successively presented molds or treating receptacles. In this respect, we accomplish the same results as the "automatic" methods. But, our method is such that the charges are in ideal working condition, in addition to being merely of proper weight and workable. This is because we preform our charges in taking them from the viscous mass and in such a way that they are transferred from mass to the mold and reach their treating stations without folding and without harmful contact with any chilling metal or other substance.

Our method contemplates the successive extrusion of charges from mass into space in such a manner and under such conditions that each charge is positively given dimensions so related to the mold interior that, when severed and properly delivered, it will freely enter the mold en bloc and will settle therein without lapping, coiling or folding; and it contemplates properly delivering each charge.

Momentarily considering the getting of one ideal charge to one mold as a distinct phase of our invention, we preferably proceed as follows: We inspect and measure the mold to be fed. Then, we provide an aperture adapted to extrude a solid column of glass of such a cross-section that a proper length of said column delivered endwise will enter the mold freely and will settle in the mold without lapping, coiling or folding. A mass of viscous glass is superimposed upon this extrusion aperture, which is preferably closed from below until a chosen instant. At this chosen instant, the closure is removed and the glass is permitted to extrude, the extrusion being performed in such a manner that a solid straight-sided column of cross-sectional dimensions substantially identical with the dimensions of the extrusion aperture moves downwardly from said extrusion aperture. When a proper length of column of the known cross-section has been extruded, such length is severed. The formed charge thus produced is dropped endwise without intermediate handling directly into the mold which is in receiving position directly therebeneath.

But extruding and severing a solid column of viscous glass of required cross-sectional length from viscous mass is not a simple matter. Merely extruding viscous glass downwardly through an aperture of proper dimensions will not necessarily produce formed charges. The viscous glass has certain natural tendencies that can only be overcome by extruding in a special way.

For instance, if you place a head of viscous glass above an aperture and permit it to extrude, it will first come out with a rounded end. This initially extruded glass, having only a connection with the mass, partakes of the nature of a falling body and tends to follow the law of falling bodies. It either falls of its own weight or it is forced downwardly by the oncoming glass, depending upon the relation between the rate of downward travel of the already-extruded glass and the rate of extrusion of the oncoming glass.

As long as the rate of extrusion is equal to the rate of downward travel of the already-extruded glass, the glass extruded will retain the form of a solid column. But, if the rate of downward travel of the already-extruded glass becomes greater than the rate of extrusion, the already-extruded glass tends to separate from the oncoming glass. In the latter case, it first forms a neck which narrows as the rates still further diverge until, finally, this lower end of the column drops abruptly, though it still remains connected by a glass string.

One phase of our method is founded upon the recognition and appreciation of these principles. Under ideal conditions, our rate of extrusion is never less than the rate of downward travel until the charge is severed. If extrusion is effected by head pressure, we use such a head of glass that, even when the rate of downward travel is greatest, the rate of extrusion will be at least equal to it. This is also true if an accelerator is used. Obviously, results may be obtained by using a minimum pressure that will produce a rate of extrusion which is always greater than the greatest rate of downward travel up to the instant of severing; or it may be effected by applied pressure which is increased as the rate of downward travel increases.

With these conditions understood and provided for, extrusion is started at such an instant prior to severing that a proper length of column will be below the severing plane at the instant severing is completed.

The extrusion is effected under head pressure or applied pressure which ensures a rate of extrusion which will be equal to the rate of downward travel of the already-extruded glass, from initiation of extrusion to severing. It is effected through a chosen aperture. The result is that a charge of chosen cross-section and length is provided and this charge is preferably dropped endwise into the mold without intermediate handling.

We shall point out later that our rate of extrusion may be slightly less than the rate of downward travel, the test being whether or not the departure is vital in its effect upon the form of the charge.

Thus, with glass under proper pressure above a proper extrusion aperture, a severing means due to operate at a known time, and means for starting extrusion at any chosen instant before severing, we can get a charge of proper weight, taken "en bloc" from mass and having shape and dimensions predetermined with relation to the shape and dimensions of the mold interior. We get this charge with a minimum exposure to the atmosphere and without marring before severing. Furthermore, this formed charge preferably drops directly and passes freely into the mold and is not marred after severing. It settles in the mold without lapping, coiling or folding. It is not marred, either by the atmosphere or by any intermediate element, and is in ideal working condition being taken "en bloc" from a mass of suitable temperature and being delivered "en bloc" without any prolonged subjection to the atmosphere or other marring elements.

Duplication of this charge, automatically and with rapidity, is the next phase of this operation. Ordinarily, such duplication would be complicated by the tendency to variation in the rate of movement of the glass mass and by the necessity for independent control of production which is, of course, wrapped up with the rate of cutting. But a true appreciation of our invention will show that it lends itself with peculiar readiness to the meeting of these conditions.

Our method comprises a multiplicity of successive operations. Each operation starts with the uncovering of the extrusion aperture to initiate extrusion and ends with a "cutting-stopping" action, the cutting and stopping of extrusion being, to all intents and purposes, simultaneous. After each "cutting-stopping" action, there is a period when no extrusion takes place, which constitutes a leeway period.

Now, if we cut more frequently to increase production, we alter the period of extrusion, because "cutting-stopping" occurs sooner after the initiation of extrusion. But we can offset this by uncovering the extrusion aperture enough sooner to bring the extrusion period back to what it was before. In other words, the conditions governing the preforming to produce an ideal charge are maintained constant even though rate of production is varied. On the other hand, if the glass mass changes in temperature so that the glass extrudes more freely, we can defer the uncovering action to initiate extrusion enough later to shorten the period of extrusion to the extent necessary to offset the increased rate of movement of the glass and get the same weight of charge. It will be obvious that, if we cut more rapidly or if the glass moves less freely, we can maintain the desired weight by initiating extrusion sooner.

This capability of adjustment at either end, of any one or more periods of extrusion, is of utmost importance. Frequently it is necessary to vary the period of extrusion to offset changes in rate of glass movement and maintain constant the weight of duplicate charges. If this were done by adjusting the instant of severing, rate of production would have to be changed. Herein lies one advantage of our method, because under it, we can simply change the instant extrusion starts, leaving the instant of cutting and, therefore, the rate of production unchanged. On the other hand, if we want to change the rate of production, we can change the instant of cutting and then start the extrusion sooner or later to maintain constant the weight of the charges.

Here is where our period of non-extrusion comes in. Within a certain range, it is immaterial how long this period of non-extrusion is, providing the period of extrusion is correct. Thus, when we vary the period of extrusion, the change is absorbed by the period of non-extrusion, which is either shortened or lengthened, as the case may be. It really amounts to a series of complete operations, each preceded by a leeway period to permit adjustment.

Variations of the weights of the charges in making different articles, may be effected merely by varying the length of the extrusion period. On the other hand, it may be that the cross-section of the formed charges just made is not suitable for the new molds to be fed. It may be so large that the charges will not enter the new mold without striking the edges and, possibly, folding. Or, it may be that such cross-section is so proportioned to the length of the charge and to the dimensions of the mold interior that the charge will lap, coil and fold after deposit in the mold. Our invention is peculiarly adapted to meet these conditions, because we can change the extrusion apertures to get the required cross-section of columns and we can change the period of extrusion, too. Thus, we can increase the cross-section and decrease the length of the charges, or vice versa. Furthermore, we can do this while maintaining the same weight, as by increasing the cross-section and decreasing the length to compensate. Or we can do this and, at the same time change the weight.

Now, when it is remembered that these changes in weight, shape and dimensions can be had by changing the extrusion aperture and the instant extrusion starts and without changing the frequency of cutting, it will be obvious that these changes can be made without changing the rate of production. And it will be equally obvious that the same changes can be made and at the same time rate of production can be changed.

It would be well to note that by initiating a new extrusion, variable in length for any charge, rather than cutting successive charges from a single flowing stream, we introduce a new element for measurement, that is, the period of extrusion. Many of the advantages of our method are traceable to this.

A type of apparatus that may be used by us in practicing our method is shown in the accompanying drawings, together with certain illustrations explaining such method.

Figure 1 shows a spout with a delivery aperture having a cross-section of one shape and dimensions.

Figure 2 shows a spout with a delivery aperture having a cross-section of different shape and dimensions.

Figure 3 is a transverse section showing a spout with a proper head of glass therein, and equipped with cutting knives and a combustion cup, the latter shown supporting the glass, by its enclosed gases burning under pressure, until the chosen instant when extrusion is to start.

Figure 4 is a view of the apparatus shown in Figure 3, showing how the cutting knives have severed a charge while the guides depending therefrom have ensured its upright position as it starts to drop.

Figure 5 shows a mold being fed with a charge that is of proper weight but is too wide.

Figure 6 shows the mold of Figure 5 being fed with a charge of proper weight and of proper dimensions.

Figure 7 shows a mold being fed with a charge that is of proper weight but is too narrow.

Figure 8 shows the mold of Figure 7 being fed with a charge that is of proper weight and that is also of proper dimensions.

Figure 9 shows a mold of elongated cross-section being fed with a charge that is of proper weight but is not of proper shape.

Figure 10 shows the mold of Figure 9 being fed with a charge that is of proper weight and that is also of proper shape.

In explaining the practical performance of our method by the use of the structure illustrated in the drawings, it will be well to consider the mass of viscous glass in the spout as maintaining a constant head, a uniform consistency and a constant temperature at the delivery orifice.

The spout 1 is, preferably, so connected to a glass furnace that a mass of glass will be superimposed upon the delivery aperture 2 at a comparatively constant head. This aperture 2 is formed in a removable bushing 3 and it may have the shape shown in either Figure 1 or 2, or it may have some other shape. Its walls are preferably tapered toward its base and the space 4 above the bushing should be at least as great in cross-section as, if not greater than, the greatest cross-section of the aperture 2, in order to insure a minimum wall friction.

The aperture 2 is of such size, in relation to the head of glass that a column of glass may extrude and a portion of such column of sufficient weight may pass below the severing means before such column is vitally altered in shape. It is, likewise, of such shape and dimensions in relation to the mold to be fed, that the column extruded will be of cross-sectional shape and dimensions best suited to the cross-sectional shape and dimensions of the mold interior, that is, of cross-sectional shape and dimensions to freely enter the mold and fit such mold as nearly as practicable.

In cooperative relation to this structure is a severing means 5, immediately beneath and closely adjacent to the aperture, and a combustion cup 6 adapted to be fed with a combustible mixture under pressure. The severing means is operable at regular intervals coinciding with presentation of the molds. The combustion cup moves into capping relation to the delivery orifice immediately after each severing action and subjects the glass therein to an enclosed combustion of gas burning under pressure.

The knives desirably carry depending guides 7 which surround each charge and prevent tilting thereof by the embracing action. Thus, it is ensured that the charge will start right-side up on its drop through space.

The importance of producing charges which are preformed to fit the mold as nearly as practicable is illustrated by Figures 5 to 10, inclusive, wherein we have shown six molds to which charges have been or are being fed. In each case the charge is of proper weight for the mold; but in some of the cases they are not of the proper dimensions or shape with relation to such molds.

In Figure 5 a mold is being fed with a charge that is of proper weight but is too wide. The charge has landed upon the edges of the mold and is folding to enter such mold. The angular edges and the folding action will both produce irremovable defects. A somewhat similar condition may arise if a long charge is thrown on its side in delivery. In Figure 6, the same weight of charge is being fed to a mold of the same dimensions; but the charge is of proper dimensions and is shown freely entering the mold in which it will settle without lapping, coiling or folding.

In Figure 7, a mold is being fed with a charge which is too narrow and has lapped and folded. In Figure 8, the same mold is being fed with a charge of the same weight; but the charge is of proper dimensions and is shown deposited and settled in the mold without lapping, coiling or folding.

In Figure 9, a mold of elongated cross-section is shown being fed with a charge of proper weight; but the charge is not of proper shape and has caught on the side edges of the mold. This will cause defects. In Figure 10, a mold of the same cross-section is being fed with a charge of the same weight; but the charge is of proper shape and will pass into the mold without lapping, coiling or folding.

In operation of the apparatus disclosed, the head of glass above the orifice should be such that, upon uncovering the aperture from beneath, the glass will be extruded therefrom as a solid column at a rate that will be substantially equal to the downward movement of the already-extruded glass until severing. This head should be maintained, at least to the extent that the glass will extrude as a solid column without vital change in form until the column is severed.

The combustion cup is withdrawn at any chosen instant before a cutting operation is to take place. Instantly, the glass starts to extrude as a column and continues to extrude for a selected time period prior to cutting. The severing is preferably effected directly over the mold interior so that the preformed charge will drop directly into the mold in as nearly a concentric position therein as possible, being prevented from tilting by the guides 7. Immediately after severing the combustion cup again moves into capping relation to the delivery orifice where it stops extrusion and serves to shape the end of the next glass column until a new extrusion is to start.

It is important to consider what is meant when it is said that the charge must be severed before it is "vitally" changed in form. Briefly stated, it means that minor changes of form may be permissible. A charge with a long thin neck that folds in the mold is just as harmful as a charge which is produced by a coiling stream.

But a short thick neck may not ruin the charge, generally depending in a large measure upon the shape and dimensions of the mold with relation to the shape and dimensions of the charge. For instance, a slight leaning of the neck against the wall of a narrow mold might not ruin such charge, although the same neck would fold so as to ruin the charge in a wider mold. Or the neck might be such that it would settle into the body of the charge without folding.

Thus, at some point in the forming of the neck, the change of form becomes vital in the sense that the column then ceases to have such form that when severed and dropped into the mold it will settle therein without lapping, coiling or folding. The severing must take place before this vital change in form occurs. Any severing before this vital change is within our invention, although in the proper operation of our process no neck is permitted to form.

Also, where the severing of the charge is performed by a knife or knives, it is desirable that the cutting operation be as nearly instantaneous as possible to prevent the diminishing cross-section from being drawn out in an attenuated string by the weight of the charge pulling on the small section being cut.

It will be seen from this that we are able, under our method, to procure a charge of any weight by controlling its dimensions. But, while maintaining the chosen weight, we can vary either or both the dimensions and the shape of the charge so that the charge will freely enter the mold and yet will conform to such mold as nearly as practicable. Not only this, but this shaping and control of dimensions are effected in a novel way by extrusion from the viscous mass and not by flowing into any intermediate element which always produces defects. Also, the segregation and separation is so effected that the charge is not attenuated and thus cooled but that it is segregated and separated as a preformed charge and in a minimum length of time, less than the full period between cutting actions.

It is important to remember that the period between severing operations determines the rate of production, because if there are twenty severing operations per minute, there will normally be twenty charges severed and deposited per minute. Then, it is important to note that our period of extrusion is always less than the period between severing operations, being started at any chosen instant before severing. Because of this, the period between severing operations can be changed while the period of extrusion is maintained, or vice versa. The result is that the rate of production may be changed while the weight of the charge is maintained; or the weight may be changed while the rate of production is maintained or both may be changed. Also, since the shape or dimensions are controlled by the extrusion aperture and the period of extrusion, and both may be maintained constant or changed while the period between severing operations is changed, it will be evident that the rate of production can be varied with or without changing the shape or dimensions of the charges.

It will be obvious that we have provided a method which may be varied in its application to a great extent. The principal characteristics of our method may be briefly reiterated, with the understanding that we claim all variations which do not depart from the principles of our improvement.

Therefore, our invention involves the separations of successive portions from a viscous mass in such a way that the portions never lose their compact form and, furthermore, are positively controlled as to their dimensions. These dimensions are predetermined with relation to the dimensions of the mold interior and may be varied to suit different molds, even though such different molds require charges of identical weight. The charges are so preformed by extrusion under certain conditions, into space; and this preformation coupled with our manner of delivery of each charge to its mold ensures a quality of ware not hitherto attainable in automatic apparatus. In addition, our method is such that the preforming action may be maintained or varied with entire independence of the rate of production of the charges.

It is important to note that the extruding action is completely stopped after each severing action. Sometimes this period of stoppage is as great as the period of extrusion. It may be varied at will.

Having thus described our invention, what we claim is:

1. In the manufacture of glassware, the method of automatically charging glass molds with compact mold charges suitable in size and shape to enter the molds and settle therein without harmful deformation; which method includes the steps of providing a mass of glass above a feed outlet of dimensions selected in accordance with the requirements of the particular molds to be charged; periodically stopping or retarding the issue of glass from said outlet by a change in fluid-pressure effective thereon; periodically passing through said outlet a portion of the molten glass to form one of the mold charges, under an extrusive pressure adequate to shape the major portion of the charge by the act of extruding; the rate of extrusion, the effective pressure and the length of time in which such glass emerges being selected and controlled so as to produce, directly beneath the outlet, a compact mass of glass having dimensions that are appropriate to the mold in which the mold charge is to be received; such dimensions resulting from the selected aperture, the selected pressure and the selected time of issue; cutting off a mold charge from each of these periodically produced masses before its shape changes to the extent of producing a tail or string that would harmfully fold upon the charge in the mold, and receiving each such charge in its mold as a unit and while it has the appropriate shape so produced.

2. In the manufacture of glassware the method of feeding charges of viscous glass from a viscous mass into successively presented molds, which comprises superimposing a substantial head of glass over an aperture, extruding a portion of said mass downwardly through said aperture into space and below a severing plane, while leaving said portion free from mechanical under-support, such extrusion being at a rate maintained at least substantially equal to the rate of downward travel of the already-extruded glass until sufficient glass to form a charge has been extruded and passed below the severing plane, and severing a mold charge from the extruded glass before the rate of extrusion becomes materially less than the rate of its downward travel, the dimensions of the aperture and the period of extrusion past the severing plane before severing being such that the charge so produced is substantially devoid of objectionable tails or strings and is of proper weight and has such dimensions that it can enter its mold freely and settle therein without lapping, coiling or folding, and then delivering said charge in such a manner that it will enter the mold freely and settle therein without lapping, coiling or folding, and after each extrusion stopping or retarding the issue of glass from said aperture by modifying the relation of the fluid-pressure effective on the glass therein.

3. In the manufacture of glassware, the method of automatically charging glass molds with compact mold charges suitable in size and shape to enter the molds and settle therein without harmful deformation; which method includes the steps of providing a mass of glass above a feed outlet of dimensions selected in accordance with the requirements of the particular molds to be charged; periodically stopping or retarding the issue of glass from said outlet, and periodically extruding through said outlet a portion of the molten glass to form one of the mold charges, under an extrusive pressure, such extrusion being at a rate maintained at least substantially equal to the rate of downward travel of the already extruded glass until sufficient glass to form the major portion of a charge has been extruded and passed below the severing plane, cutting off a mold charge from each of these periodically produced masses before its shape changes to such an extent that it would harmfully fold upon itself in the mold, and then delivering said charge in such a manner that it will enter the mold freely and settle therein without lapping, coiling or folding.

In testimony whereof we hereby affix our signatures.

WILLIAM A. REEVES.
OLIVER M. TUCKER.